US012789477B2

(12) United States Patent
Zhao et al.

(10) Patent No.: US 12,789,477 B2
(45) Date of Patent: Nov. 10, 2026

(54) INDUCTION WELDING THERMOPLASTIC BODIES WITH MULTIPLE FIBER ORIENTATIONS

(71) Applicant: Rohr, Inc., Chula Vista, CA (US)

(72) Inventors: Wenping Zhao, Glastonbury, CT (US); Lei Xing, South Windsor, CT (US)

(73) Assignee: Rohr, Inc., Chula Vista, CA (US)

( * ) Notice: Subject to any disclaimer, the term of this patent is extended or adjusted under 35 U.S.C. 154(b) by 480 days.

(21) Appl. No.: 18/403,336

(22) Filed: Jan. 3, 2024

(65) Prior Publication Data

US 2024/0217185 A1 Jul. 4, 2024

Related U.S. Application Data

(60) Provisional application No. 63/436,808, filed on Jan. 3, 2023.

(51) Int. Cl.
*B29C 65/00* (2006.01)
*B29C 65/36* (2006.01)

(52) U.S. Cl.
CPC ............ *B29C 65/36* (2013.01); *B29C 66/721* (2013.01)

(58) Field of Classification Search
CPC . B29C 65/36; B29C 66/721; B29C 66/73921; B29C 66/7212; B29C 66/1122; B29C 3668/65; B29C 66/131; B29C 65/364; B29C 66/112; B29C 65/3684; B29C 66/524; B29C 66/532; B29C 66/71; B29C 66/61; B29C 66/91221
USPC ....... 219/673, 553, 633, 634, 645, 765, 777; 156/274.2, 274.6, 272.2, 498, 580.1, 73.4
See application file for complete search history.

(56) References Cited

U.S. PATENT DOCUMENTS 4,845,326 A 7/1989 Rudd
4,978,825 A * 12/1990 Schmidt .............. B29C 65/3668 156/274.2
5,240,542 A 8/1993 Miller
(Continued)

FOREIGN PATENT DOCUMENTS

JP H1177835 A 3/1999

OTHER PUBLICATIONS

EP search report for EP24150204.6 dated Jun. 4, 2024.

*Primary Examiner* — Jacob A Smith
(74) *Attorney, Agent, or Firm* — Getz Balich LLC

(57) ABSTRACT

During a manufacturing method, a first thermoplastic body is arranged with a second thermoplastic body. The first thermoplastic body and/or the second thermoplastic body includes a plurality of fibers embedded within a thermoplastic matrix. The fibers include a plurality of parallel first fibers and a plurality of parallel second fibers that are angularly offset from the parallel first fibers. A conductive element is arranged vertically next to a surface of the first thermoplastic body. The first thermoplastic body is induction welded to the second thermoplastic body using the conductive element. The conductive element includes a first segment and a second segment. The first segment is at least substantially parallel with the plurality of parallel first fibers. The second segment is at least substantially parallel with the plurality of parallel second fibers. A first portion of the conductive element is vertically above and overlaps a second portion of the conductive element.

20 Claims, 13 Drawing Sheets

(56) References Cited

U.S. PATENT DOCUMENTS

| | | | | |
|---|---|---|---|---|
| 5,483,043 | A * | 1/1996 | Sturman, Jr. | B29C 35/08 219/634 |
| 6,677,559 | B2 | 1/2004 | Johnson, Jr. | |
| 2020/0198258 | A1 * | 6/2020 | Gallo | B29C 65/3696 |
| 2022/0241887 | A1 | 8/2022 | Van Tooren | |

* cited by examiner

INDUCTION WELDING THERMOPLASTIC BODIES WITH MULTIPLE FIBER ORIENTATIONS

This application claims priority to U.S. Patent Appln. No. 63/436,808 filed Jan. 3, 2023, which is hereby incorporated herein by reference in its entirety.

BACKGROUND

1. Technical Field

This disclosure relates generally to joining bodies together and, more particularly, to induction welding.

2. Background Information

It is known in the art to join discrete bodies together using induction welding. These joined bodies are typically constructed from like materials; e.g., metal or fiber-reinforced composite. The discrete bodies are induction welded together using an induction welder. Various types and configurations of induction welders are known in the art. While these known induction welders have various benefits, there is still room in the art for improvement. For example, there is a need in the art for an induction welder and method that can provide a wider, more robust weld seam between the joined bodies, particularly where the bodies are constructed from fiber reinforced thermoplastic material.

SUMMARY OF THE DISCLOSURE

According to an aspect of the present disclosure, a manufacturing method is provided during which a first thermoplastic body is arranged with a second thermoplastic body. The first thermoplastic body and/or the second thermoplastic body each includes a plurality of fibers embedded within a thermoplastic matrix. The fibers include a plurality of parallel first fibers and a plurality of parallel second fibers that are angularly offset from the parallel first fibers. A conductive element is arranged vertically next to a surface of the first thermoplastic body. The first thermoplastic body is induction welded to the second thermoplastic body using the conductive element. The conductive element includes a first segment and a second segment. The first segment is at least substantially parallel with the plurality of parallel first fibers. The second segment is at least substantially parallel with the plurality of parallel second fibers. A first portion of the conductive element is vertically above and overlaps a second portion of the conductive element.

According to another aspect of the present disclosure, another manufacturing method is provided during which a first thermoplastic body is arranged with a second thermoplastic body. The first thermoplastic body and/or the second thermoplastic body each includes a plurality of fibers embedded within a thermoplastic matrix. A first conductive element segment and a second conductive element segment of an induction welder is arranged vertically next to a surface of the first thermoplastic body. The first conductive element segment is angularly offset from the second conductive element segment in a reference plane parallel with the surface of the first thermoplastic body. At least an intermediate portion of the second conductive element segment is vertically above and crosses an intermediation portion of the first conductive element segment. The first thermoplastic body is induction welded to the second thermoplastic body using the first conductive element segment and the second conductive element segment.

According to still another aspect of the present disclosure, another manufacturing method is provided during which a first thermoplastic body is arranged with a second thermoplastic body. The first thermoplastic body and/or the second thermoplastic body each includes a plurality of fibers embedded within a thermoplastic matrix. A conductive element is arranged vertically next to a surface of the first thermoplastic body. The conductive element is configured into a vertical stack of a plurality of concentric loops. The first thermoplastic body is induction welded to the second thermoplastic body using the plurality of concentric loops.

The fibers may include a plurality of parallel first fibers and a plurality of parallel second fibers that are angularly offset from the parallel first fibers. At least a portion of the first conductive element segment may be parallel with the parallel first fibers. At least a portion of the second conductive element segment may be parallel with the parallel second fibers.

The fibers may include a plurality of parallel first fibers and a plurality of parallel second fibers that are angularly offset from the parallel first fibers. The first conductive element segment may be at least substantially parallel with the parallel first fibers. The second conductive element segment may be at least substantially parallel with the parallel second fibers.

The first conductive element segment may be angularly offset from the second conductive element segment by a right angle or an acute angle in the reference plane.

The first conductive element segment and the second conductive element segment may be arranged in series between and connected to a first lead and a second lead. The first lead and the second lead may electrically connect the first conductive element segment and the second conductive element segment to an electrical power source.

The first conductive element segment may be connected to and between a first set of leads. The first set of leads may electrically connect the first conductive element segment to a first electrical power source. The second conductive element segment may be connected to and between a second set of leads. The second set of leads may electrically connect the second conductive element segment to a second electrical power source.

The induction welding may include exciting some of the parallel first fibers and some of the parallel second fibers with eddy currents generated by the conductive element.

The parallel second fibers may be perpendicular to the parallel first fibers.

The parallel second fibers may be angularly offset from the parallel first fibers by an acute angle.

The first portion of the conductive element may cross the second portion of the conductive element.

The first portion of the conductive element may be parallel with the second portion of the conductive element.

An airgap may be formed by and may extend vertically between the first segment and the surface of the first thermoplastic body. The airgap is also be formed by and may extend vertically between the second segment and the surface of the first thermoplastic body.

The conductive element may extend longitudinally along a centerline. The first segment may extend longitudinally along a first portion of the centerline. The first portion of the centerline may be straight in a reference plane. The second segment may extend longitudinally along a second portion of the centerline. The second portion of the centerline may be straight in the reference plane.

The first portion of the centerline may be perpendicular to the second portion of the centerline.

The first portion of the centerline may be angularly offset from the second portion of the centerline by an acute angle.

The conductive element may be configured into a vertical stack of a plurality of loops.

The first segment and the second segment may be included in one of the loops.

One of the loops may each have a circular geometry.

One of the loops may each have a polygonal geometry.

Some or all of the loops may be laterally aligned.

Some or all of the loops may be laterally offset.

The conductive element may extend longitudinally along a centerline. The first segment may extend longitudinally along a first portion of the centerline. The first portion of the centerline may be curved in a reference plane that is parallel with the surface of the first thermoplastic body. The second segment may extend longitudinally along a second portion of the centerline. The second portion of the centerline may be curved in the reference plane.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
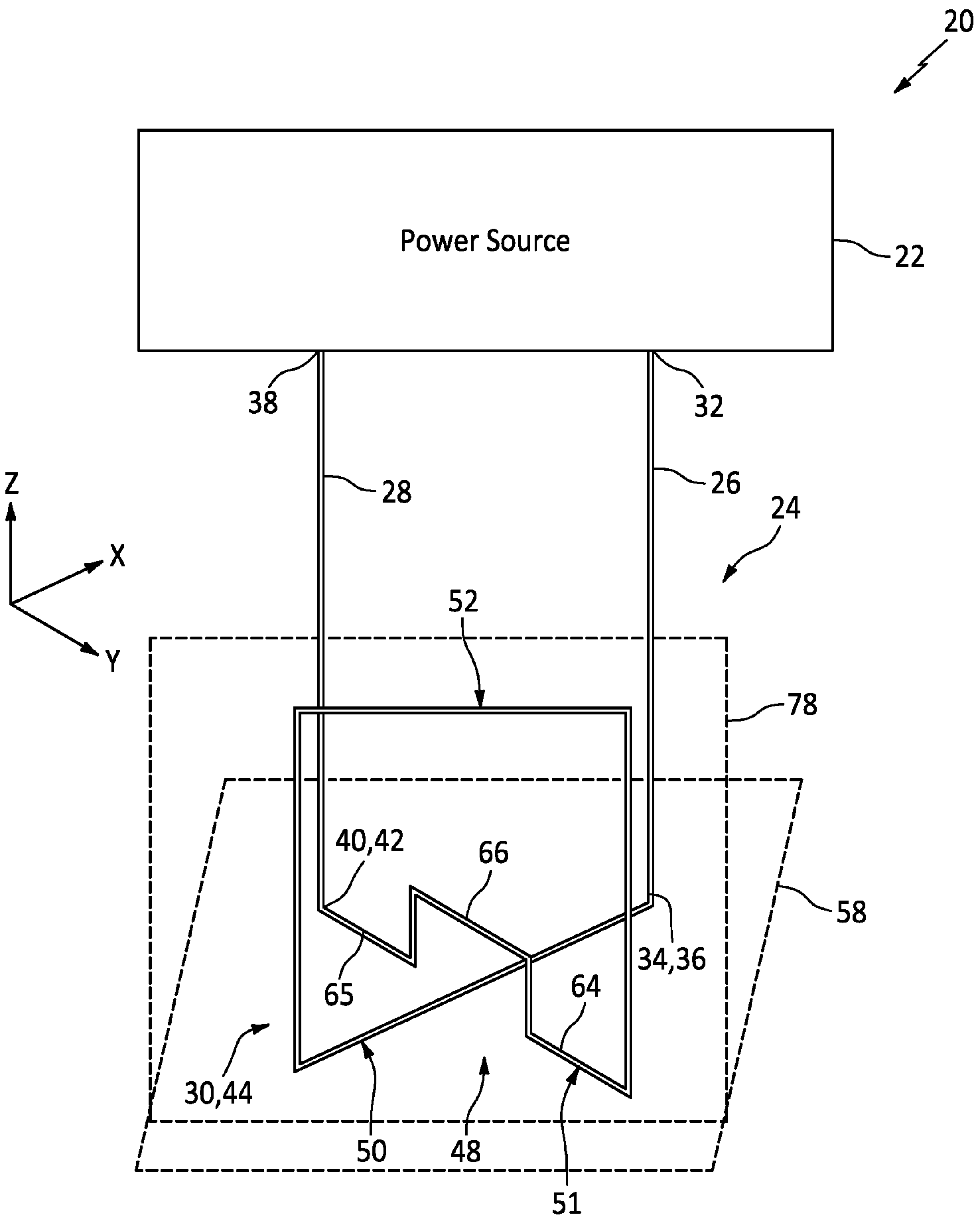
FIG. 1 is a schematic illustration of an induction welder.

FIG. 1 illustrates an induction welder 20. This induction welder 20 is configured to induction weld two or more bodies together, which bodies may be thermoplastic bodies or any other type of induction weldable bodies. The induction welder 20 of FIG. 1 includes a power source 22 and an induction coil assembly 24. The induction coil assembly 24 includes an electrical first lead 26, an electrical second lead 28 and an induction welding coil 30.

The power source 22 is configured to generate a periodic electrical current. The power source 22, for example, may be configured as a high-frequency current source. The power source 22 may be or otherwise include an alternating current (AC) generator, transformer, amplifier, etc. Alternatively, the power source 22 may include a direct current (DC) generator, transformer, amplifier, battery, etc. electrically coupled with an oscillator. The present disclosure, however, is not limited to such exemplary power sources.

The first lead 26 extends along a (e.g., straight) centerline between a first end 32 of the first lead 26 and an opposing, second end 34 of the first lead 26. The first lead first end 32 is electrically coupled with the power source 22. The first lead second end 34 is electrically connected with a first end 36 of the induction welding coil 30.

The second lead 28 extends along a (e.g., straight) centerline between a first end 38 of the second lead 28 and an opposing, second end 40 of the second lead 28. The second lead centerline may (or may not) be parallel with the first lead centerline. The second lead first end 38 is electrically coupled with the power source 22. The second lead second end 40 is electrically connected with a second end 42 of the induction welding coil 30.

Figure 2:
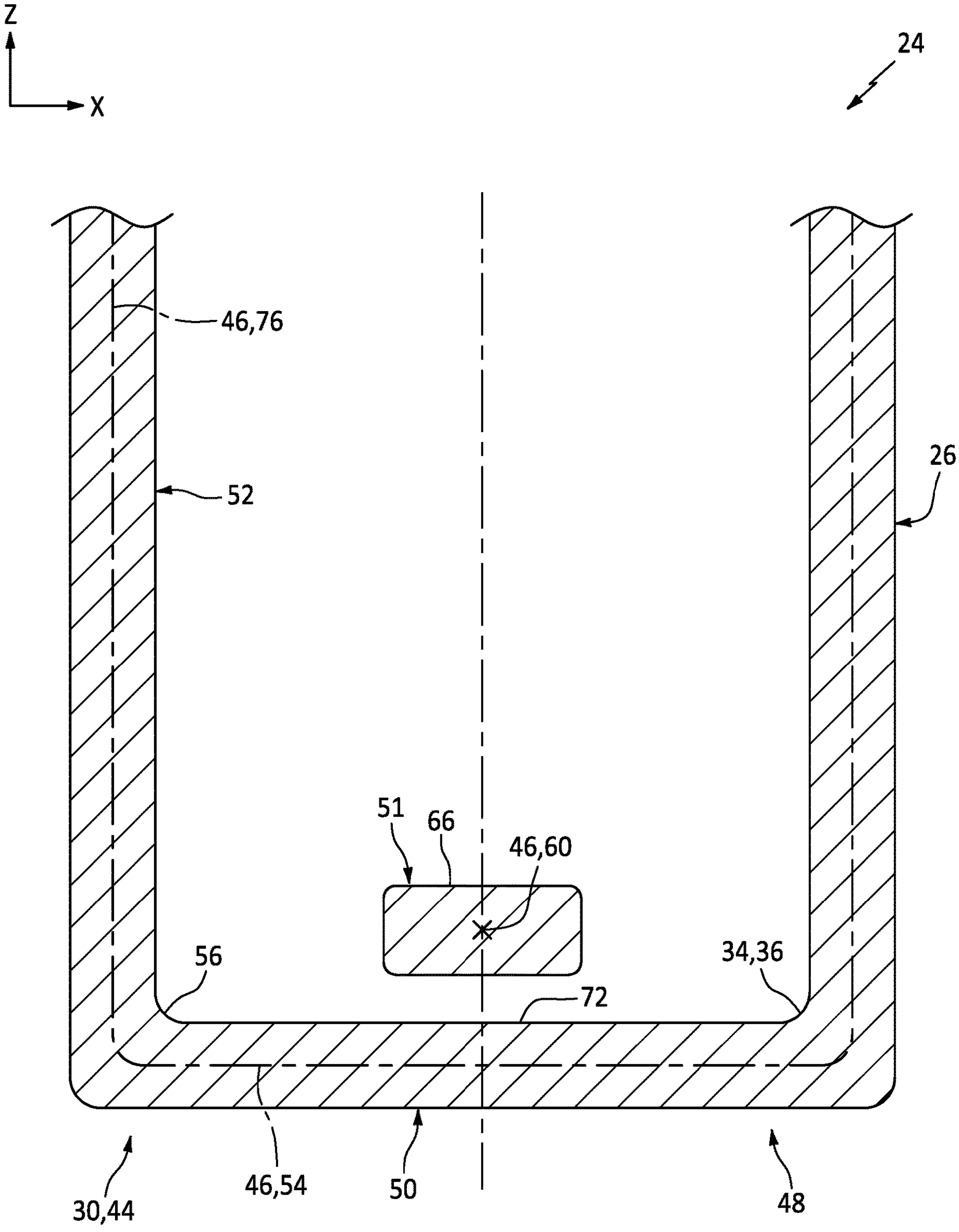
FIGS. 2-4 are various partial sectional illustrations of the induction welder.
Figure 3:
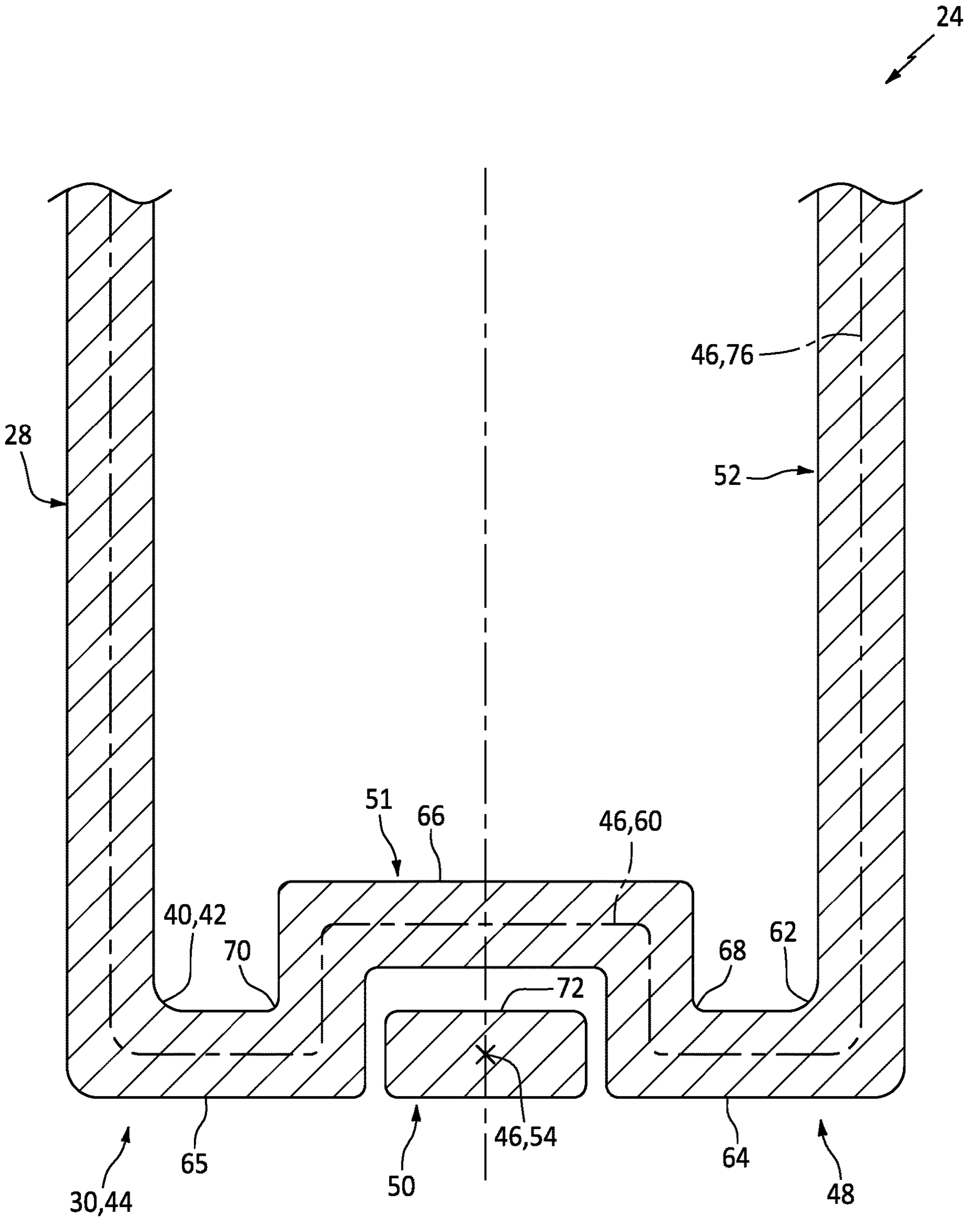
Figure 4:
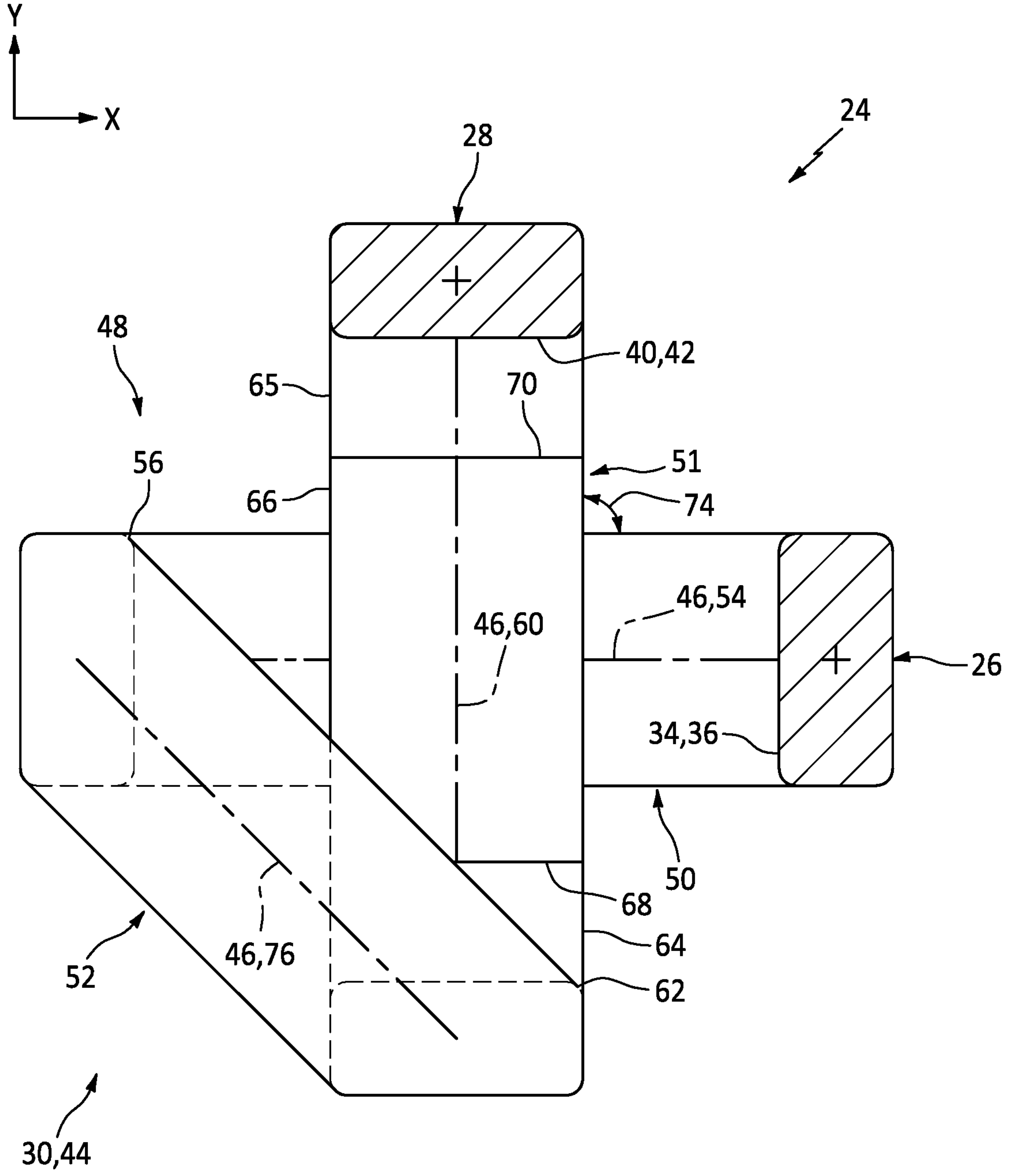

Referring to FIGS. 2-4, the induction welding coil 30 may be configured as or otherwise include an electrically conductive element 44 such as a formed, tortuous electrically conductive line and/or conduit. The induction welding coil 30 and its conductive element 44 extend along a non-straight, tortuous centerline 46 of the induction welding coil 30 and its conductive element 44 between and to the coil first end 36 and the coil second end 42. The conductive element 44 may be configured to provide the induction welding coil 30 with a crossed (e.g., X-shaped) coil head 48. The induction welding coil 30 and its conductive element 44 of FIGS. 2-4, for example, include a first induction welding segment 50 ("first segment"), a second induction welding segment 51 ("second segment") and a bridge segment 52; see also FIG. 1.

Referring to FIGS. 2 and 4, the first segment 50 extends longitudinally along a first segment portion 54 of the coil centerline 46 from the coil first end 36 to a second end 56 of the first segment 50. The first segment portion 54 of the coil centerline 46 is a longitudinal centerline of the first segment 50. The coil centerline 46 and its first segment portion 54 (and the first segment 50) may follow a straight line trajectory along at least a portion or an entirety of the first segment 50 between and to the coil first end 36 and the first segment second end 56. The first segment 50 may (e.g., entirety) lay in and/or extend along a first reference plane (e.g., see plane 58 in FIG. 1); e.g., a plane parallel to a plane of FIG. 4.

Referring to FIGS. 3 and 4, the second segment 51 extends longitudinally along a second segment portion 60 of the coil centerline 46 from a first end 62 of the second segment 51 to the coil second end 42. The second segment portion 60 of the coil centerline 46 is a longitudinal centerline of the second segment 51. The second segment 51 of FIG. 3 includes a first end portion 64, a second end portion 65 and an intermediate portion 66 longitudinally between and connected to the first end portion 64 and the second end portion 65.

The first end portion 64 extends longitudinally along the second segment portion 60 of the coil centerline 46 from the second segment first end 62 to a first end 68 of the intermediate portion 66. The coil centerline 46 and its second segment portion 60 (and the first end portion 64) may follow a straight line trajectory along at least a portion or an entirety of the first end portion 64 between and to the second segment first end 62 and the intermediate portion 66.

The second end portion 65 extends longitudinally along the second segment portion 60 of the coil centerline 46 from the coil second end 42 to a second end 70 of the intermediate portion 66. The coil centerline 46 and its second segment portion 60 (and the second end portion 65) may follow a straight line trajectory along at least a portion or an entirety of the second end portion 65 between and to the coil second end 42 and the intermediate portion 66. The coil centerline 46 along the first end portion 64 may be parallel with (e.g., coaxial with) the coil centerline 46 along the second end portion 65.

The intermediate portion 66 extends longitudinally along the second segment portion 60 of the coil centerline 46 from the first end portion 64 to the second end portion 65. This intermediate portion 66 is configured to laterally cross over an intermediate portion 72 of the first segment 50. The intermediate portion 66 of FIG. 3, for example, has a channeled (e.g., a U-shaped) geometry. The intermediate portion 66 of the second segment 51 may thereby be vertically offset from (e.g., spaced vertically from) the intermediate portion 72 of the first segment 50 and laterally overlap the intermediate portion 72 of the first segment 50. Note, while the second segment portion 60 of the coil centerline 46 along the intermediate portion 66 is non-straight (e.g., U-shaped) when viewed in the reference plane of FIG. 3, an entirety of the second segment 51 and its second segment portion 60 of the coil centerline 46 may follow a straight trajectory when viewed in the first reference plane; e.g., see FIG. 4. Thus, both the first segment 50 and the second segment 51 may have straight line geometries in the first reference plane.

The second segment 51 of FIG. 3 may (e.g., substantially) lay in and/or extend along the first reference plane. More particularly, the first end portion 64 and the second end portion 65 may (e.g., completely) lay in and/or extend along the first reference plane. Within this first reference plane, referring to FIG. 4, the second segment 51 is angularly offset from the first segment 50 by an angle 74. This angle 74 may be a right angle—ninety degrees (90°). Alternatively, the angle 74 may be a (e.g., non-zero) acute angle; e.g., between fifteen degrees (15°) and thirty degrees (30°), between thirty degrees (30°) and sixty degrees (60°), between sixty degrees (60°) and eighty-five degrees (85°). The present disclosure, however, is not limited to the foregoing exemplary angles between the first segment 50 and the second segment 51. Rather, the angle 74 between the first segment 50 and the second segment 51 may be selected as any angle to (e.g., substantially) align the first segment 50 and the second segment 51 with respective fibers in the bodies to be induction welded as described below in further detail.

The bridge segment 52 extends longitudinally along a bridge segment portion 76 of the coil centerline 46 from the first segment 50 to the second segment 51. More particularly, the bridge segment 52 extends longitudinally between and to the first segment second end 56 and the second segment first end 62. The bridge segment 52 thereby electrically connects the first segment 50 and the second segment 51 in series along the coil centerline 46/between the coil first end 36 and the coil second end 42. Referring to FIG. 1, the bridge segment 52 may lay in and/or extend along a second reference plane (e.g., 78) that is angularly offset from (e.g., perpendicular to, acutely angled from) the first reference plane (e.g., 58). Within this second reference plane, the bridge segment 52 may have a channeled (e.g., a U-shaped) geometry. Within the first reference plane however, referring to FIG. 4, the bridge segment 52 may have a straight line geometry between and to the first segment 50 and the second segment 51. The present disclosure, however, is not limited to such an exemplary arrangement.

Figure 5:
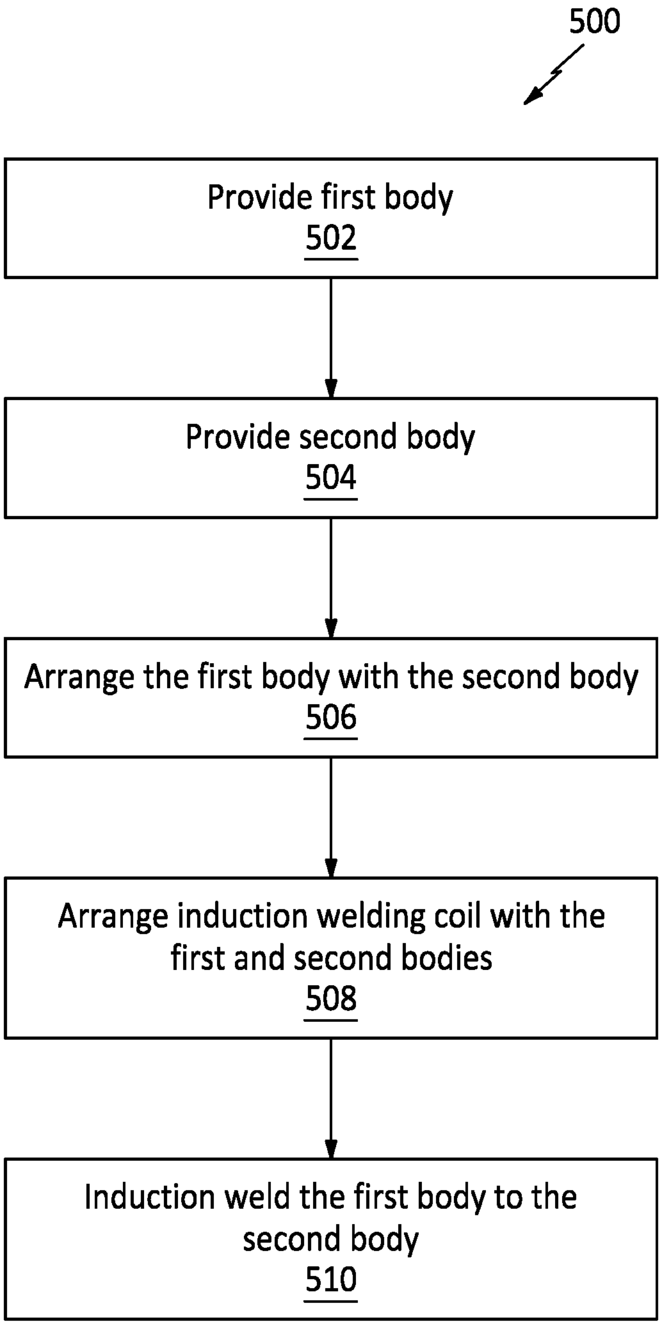
FIG. 5 is a flow diagram of a method for manufacturing a component.
Figure 6:
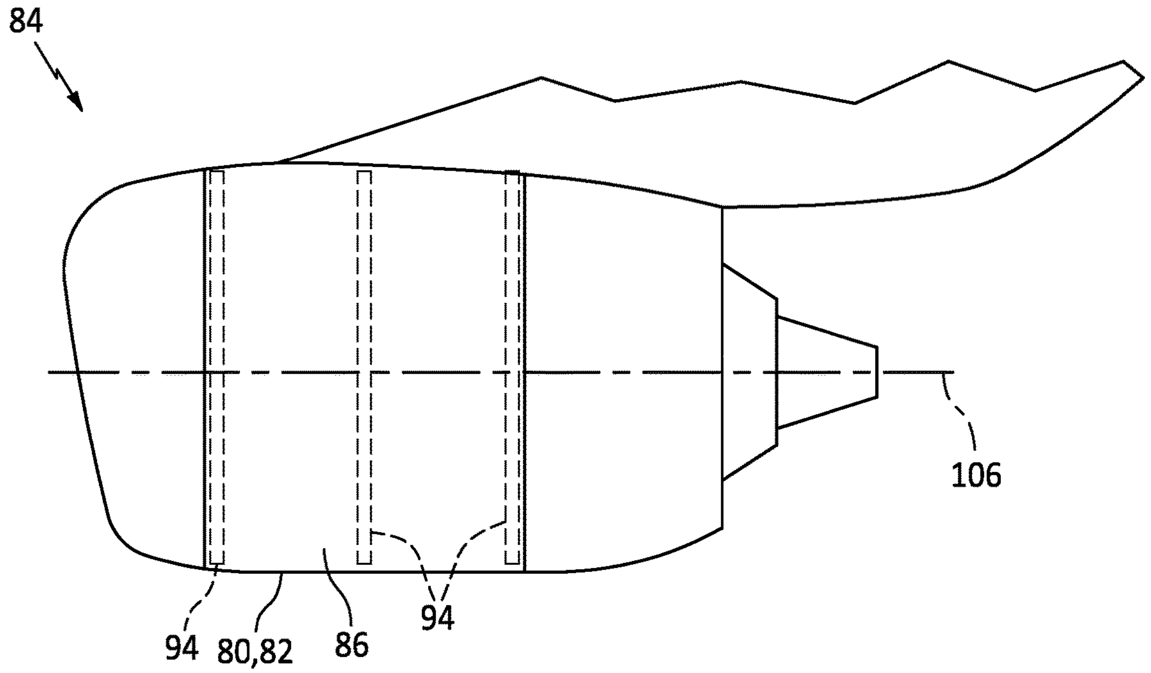
FIG. 6 is an illustration of an aircraft propulsion system with certain hidden features shown by dashed lines.

FIG. 5 is a flow diagram of a method 500 for manufacturing a component 80. Referring to FIG. 6, an example of the component 80 is a fan cowl 82 for a nacelle of an aircraft propulsion system 84. The component 80, however, may alternatively be configured as or may otherwise be included as part of another nacelle component, an aircraft control surface, a wing or an aircraft fuselage. The present disclosure, however, is not limited to manufacturing such exemplary components nor to aircraft propulsion system applications. For example, the method 500 may be performed for manufacturing any type or configuration of component where two or more bodies are joined via induction welding.

Figure 7:
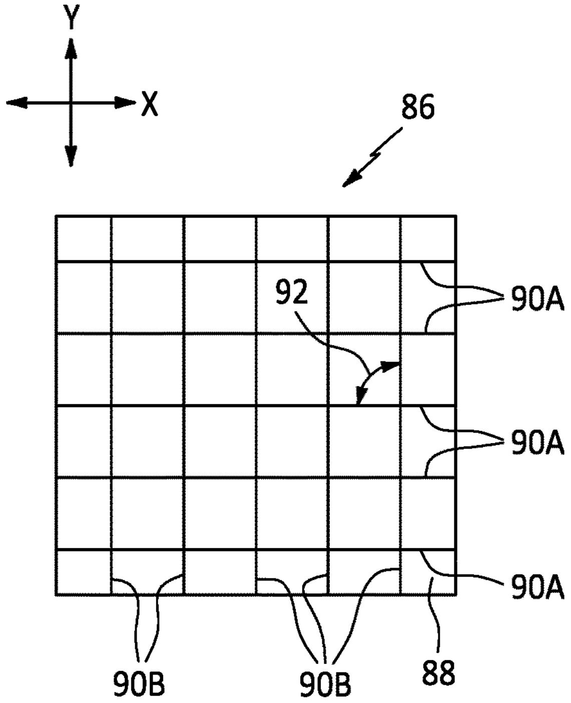
FIG. 7 is an illustration of a portion of a first body with fiber reinforcement within a thermoplastic matrix.

In step 502, a first body 86 is provided as shown, for example, in FIG. 7. This first body 86 may be configured as a thermoplastic body. The first body 86 of FIG. 7, for example, includes fiber reinforcement (e.g., embedded) within a thermoplastic matrix 88. The fiber reinforcement may be or otherwise include carbon fibers; however, the present disclosure is not limited thereto. The fiber reinforcement may include one or more first fibers 90A and one or more second fibers 90B. The first fibers 90A may be arranged at least substantially (e.g., +/−1° or 2°) or exactly parallel with one another. The second fibers 90B may be arranged at least substantially (e.g., +/−10 or 2°) or exactly parallel with one another. The second fibers 90B may also be angularly offset from the first fibers 90A. Each second fiber 90B of FIG. 7, for example, is angularly offset from each first fiber 90A by an angle 92; e.g., a right angle (90°), or alternatively a non-zero acute angle or an obtuse angle. The first fibers 90A and the second fibers 90B, for example, may be woven together. The present disclosure, however, is not limited to such an exemplary fiber reinforcement arrangement.

The first body 86 may be configured as a skin of the component 80. For example, referring to FIG. 6, the first body 86 may be configured as an exterior skin (e.g., exterior layer) of the fan cowl 82.

Figure 8:
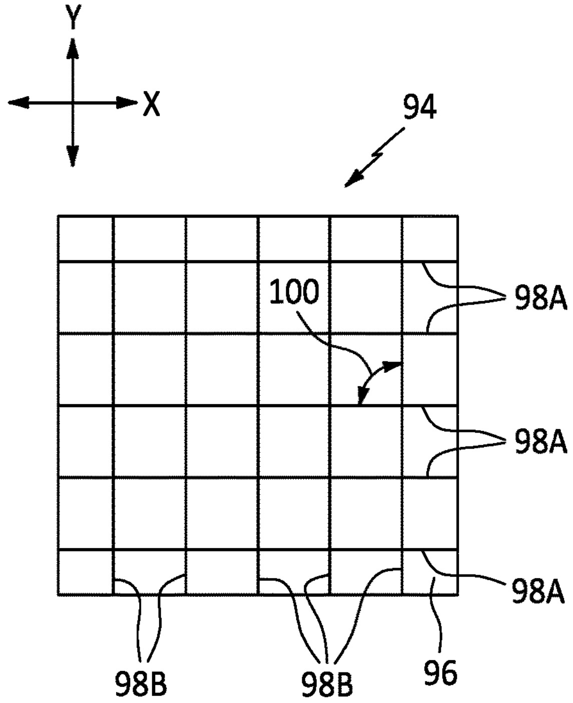
FIG. 8 is an illustration of a portion of a second body with fiber reinforcement within a thermoplastic matrix.

In step 504, a second body 94 is provided as shown, for example, in FIG. 8. This second body 94 may be configured as a thermoplastic body. The second body 94 of FIG. 8, for example, includes fiber reinforcement (e.g., embedded) within a thermoplastic matrix 96. The second body fiber reinforcement material may be the same (or different than) the first body fiber reinforcement material. The fiber reinforcement may be or otherwise include carbon fibers; however, the present disclosure is not limited thereto. The fiber reinforcement may include one or more first fibers 98A and one or more second fibers 98B. The first fibers 98A may be arranged at least substantially (e.g., +/−10 or 2°) or exactly parallel with one another. The second fibers 98B may be arranged at least substantially (e.g., +/−1° or 2°) or exactly parallel with one another. The second fibers 98B may also be angularly offset from the first fibers 98A. Each second fiber 98B of FIG. 8, for example, is angularly offset from each first fiber 98A by an angle 100; e.g., a right angle (90°), or alternatively a non-zero acute angle or an obtuse angle. The first fibers 98A and the second fibers 98B, for example, may be woven together. The present disclosure, however, is not limited to such an exemplary fiber reinforcement arrangement. The second body thermoplastic matrix material may be the same (or different than) the first body thermoplastic matrix material.

The second body 94 may be configured as a structural reinforcement of the component 80. For example, referring to FIG. 6, the second body 94 may be configured as one of a plurality of structural reinforcements of the fan cowl 82, which structural reinforcements are arranged on an interior side of the fan cowl 82 and, thus, below (e.g., radially within) the exterior skin of FIG. 6. Examples of the structural reinforcements include, but are not limited to, a stiffener, a rib, a flange, etc.

Figure 9:
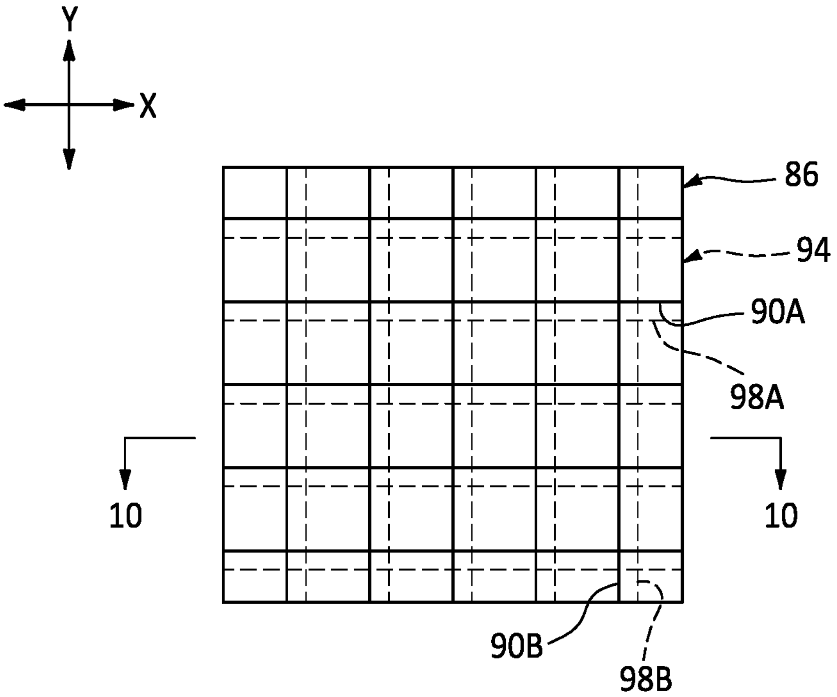
FIG. 9 is an illustration of a portion of the second body arranged below the first body with the fiber reinforcement of the second body shown by dashed lines.
Figure 10:
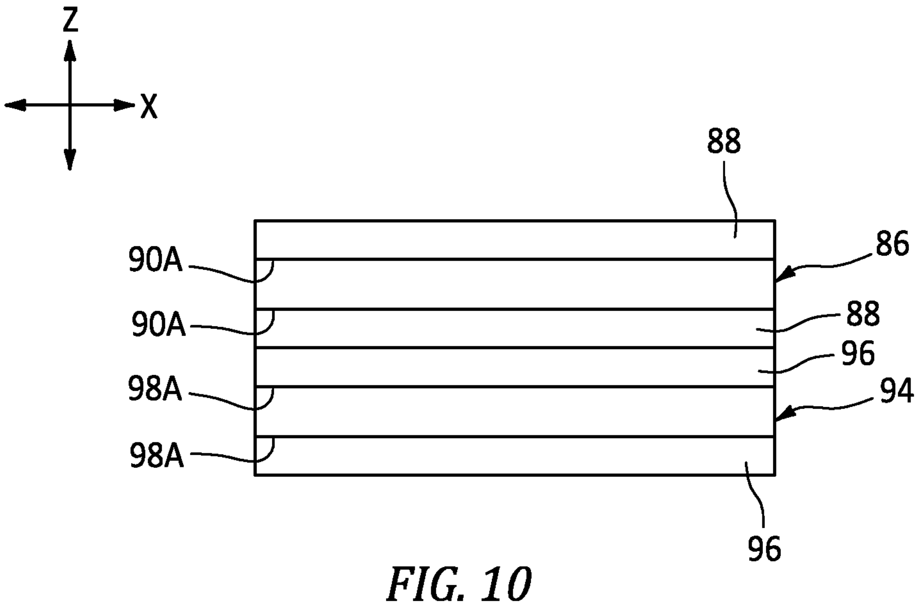
FIG. 10 is a sectional illustration of the first body and the second body taken along line 10-10 in FIG. 9.

In step 506, the first body 86 is arranged with the second body 94 as shown, for example, in FIGS. 9 and 10. In this arrangement, the second body 94 is next to and engages (e.g., contacts) the first body 86. The first fibers 90A in the first body 86 may be arranged at least substantially (e.g., +/−10 or 2°) or exactly parallel with the first fibers 98A in the second body 94. The second fibers 90B in the first body 86 may be arranged at least substantially (e.g., +/−1° or 2°) or exactly parallel with the second fibers 98B in the second body 94. However, in other embodiments, one or more of these fibers 90A and 90B, 98A and 98B may be respectively angularly offset from one another.

In step 508, the induction welding coil 30 is arranged with the first body 86 and the second body 94. For example, referring to FIGS. 11 and 12, the conductive element 44 and its first segment 50 and its second segment 51 are disposed next to an exterior surface 102 of the first body 86; e.g., an exterior surface of the fan cowl 82. Here, the surface 102 of the first body 86 is parallel with the first reference plane. The conductive element 44 and one or more of its segments 50 and 51 may engage the first body 86. For example, the conductive element 44 and one or more of its segments 50 and 51 may be vertically spaced from the first body 86 and its surface 102 by a respective (e.g., small) gap; e.g., an air gap. The first segment 50 may be arranged at least substantially (e.g., +/−1° or 2°) or exactly parallel with at least some of the fibers 90A in the first body 86 and/or at least some of the fibers 98A in the second body 94 (see FIGS. 7 and 8). The second segment 51 and any one or more or all of its portions 64-66 may be arranged at least substantially (e.g., +/−1° or 2°) or exactly parallel with at least some of the fibers 90B in the first body 86 and/or at least some of the fibers 98B in the second body 94.

In step 510, the first body 86 is induction welded to the second body 94 using the induction welding coil 30. The power source 22 (see FIG. 1), for example, may provide a high frequency (e.g., alternating) current to the induction welding coil 30. The induction welding coil 30 may subsequently generate electromagnetic waves which excite one or more of the reinforcement fibers (e.g., 90A and/or 90B) via eddy currents within the first body 86 and/or the one or more of the reinforcement fibers (e.g., 98A and/or 98B) via eddy currents within the second body 94. This excitation may elevate a temperature of the first body 86 and/or the second body 94 to a melting point temperature where the thermoplastic matrix of the first body 86 and/or the thermoplastic matrix of the second body 94 melts. A melt layer 104 may form at an interface between the first body 86 and the second body 94. This melt layer 104 may bond the first body 86 and the second body 94 together upon cooling thereof. The induction welding coil 30 may be moved longitudinally (e.g., in the x-axis direction and/or circumferentially about a centerline 106 of the component 80 (see FIG. 6)) to provide an elongated welded seam between the first body 86 and the second body 94.

Figure 11:
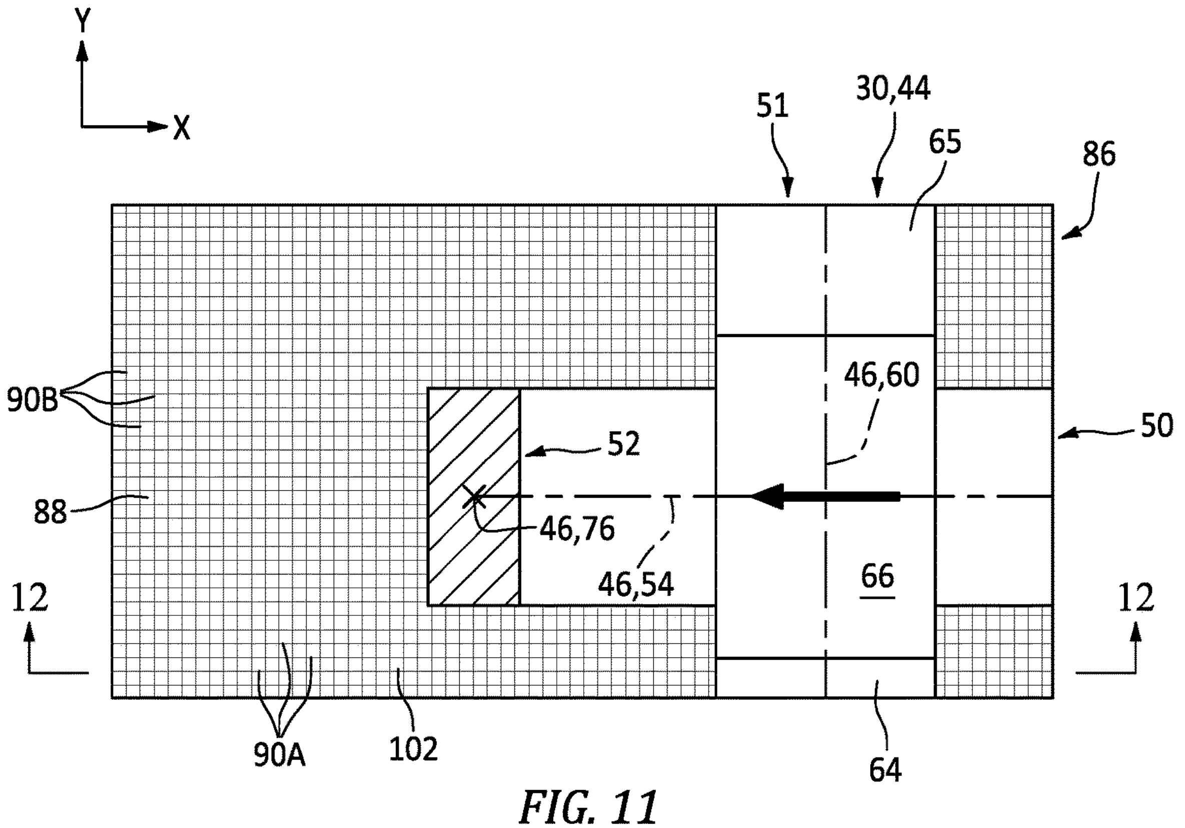
FIG. 11 is an illustration of a portion of the induction welding coil arranged with the first body and the second body.
Figure 12:
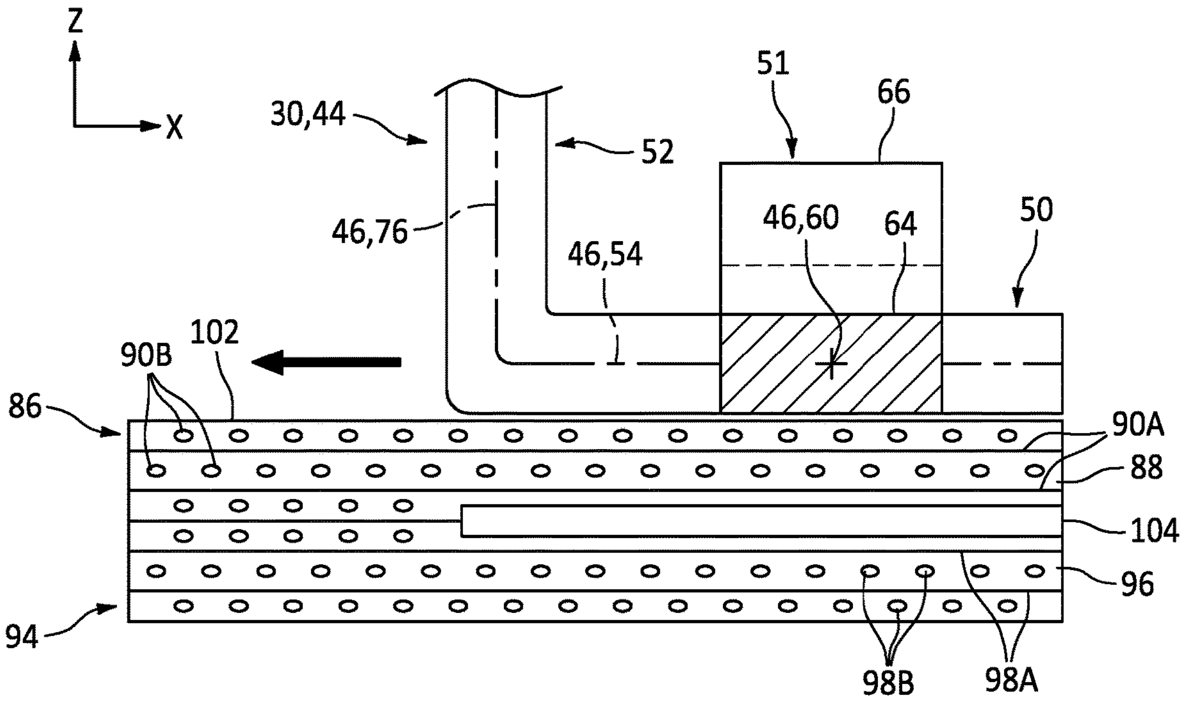
FIG. 12 is a sectional illustration of the induction welding coil, the first body and the second body taken along line 12-12 in FIG. 11.
Figure 13:
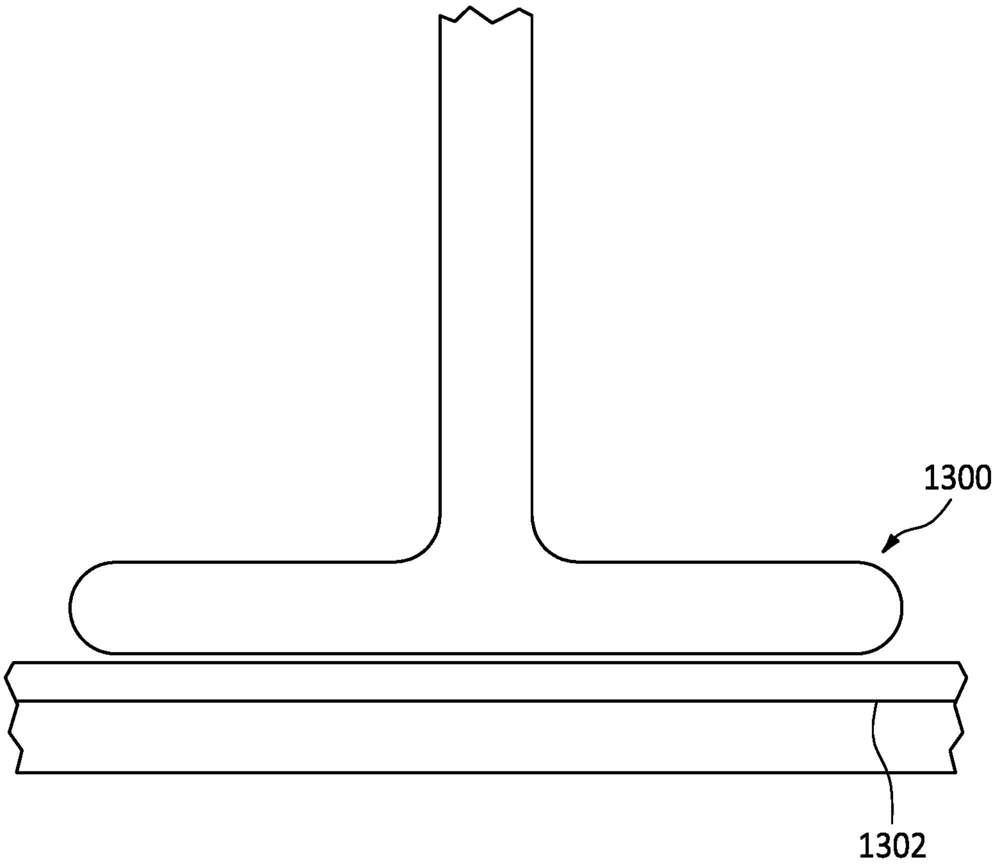
FIG. 13 (PRIOR ART)
FIG. 13 is an illustration of a prior art induction welding coil adjacent a body.

Referring to FIGS. 11 and 12, the induction welding coil 30 of the present disclosure is configured to produce a relatively wide weld seam between the first body 86 and the second body 94. For example, each coil segment 50, 51 of the induction welding coil 30 may be aligned with a respective fiber or fibers 90A, 90B within the first body 86 and/or a respective fiber or fibers 98A, 98B within the second body 94. Each coil segment 50, 51 may thereby be associated with and excite its own respective fiber(s). Furthermore, the induction welding coil 30 can excite both the first fibers 90A, 98A and the second fibers 90B, 98B within the first body 86 and/or the second body 94 simultaneously. By contrast, a single hairpin coil 1300 as shown in FIG. 13 will primarily only excite an aligned and parallel fiber 1302 of fibers. Thus, such a single hairpin coil 1300 will provide a relatively narrow weld seam after a single longitudinal pass with limited utilization of the electromagnetic field generated by the induction welder unit.

Figure 14:
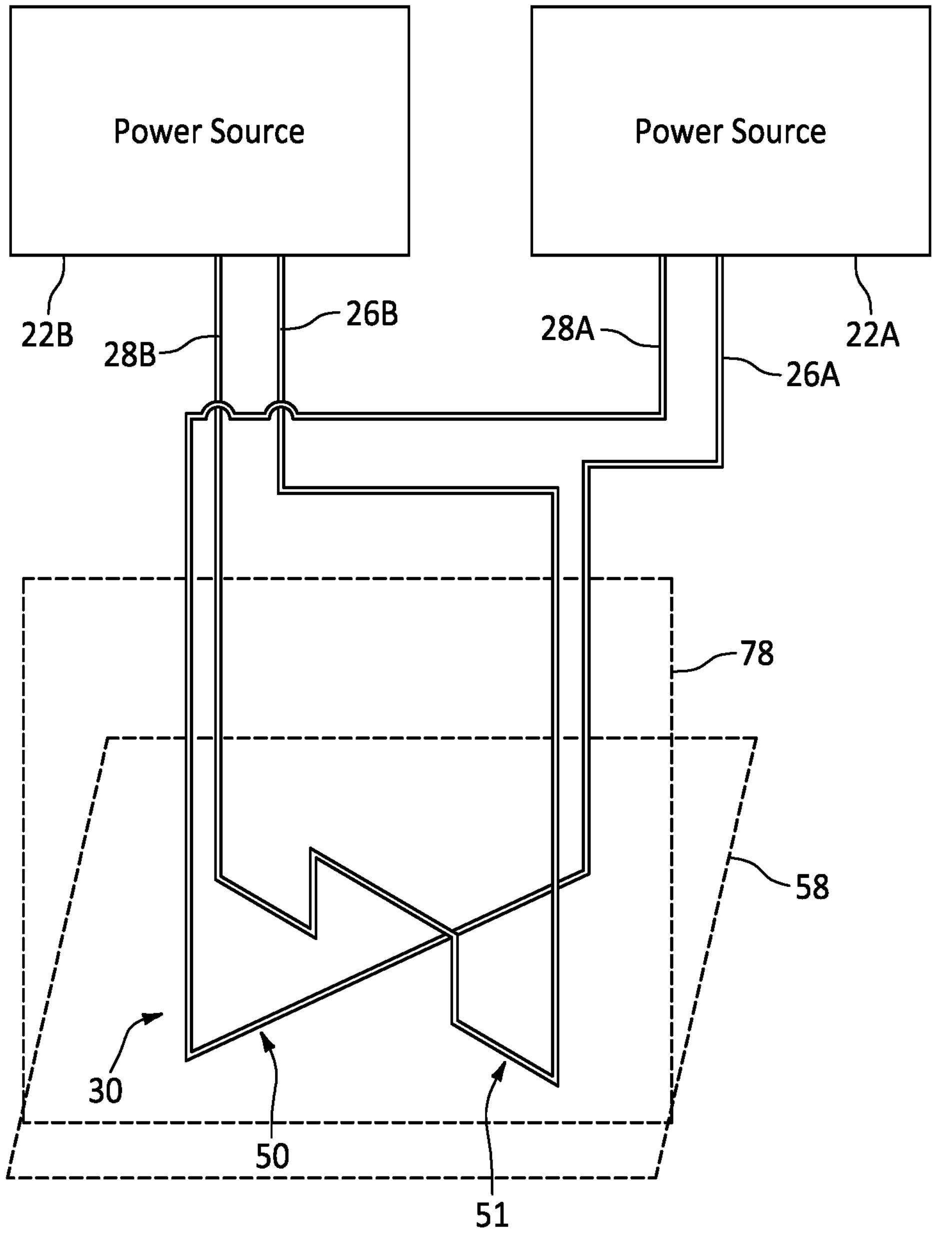
FIG. 14 is a schematic illustration of the induction welder with multiple power sources.

In some embodiments, referring to FIG. 1, the first segment 50 and the second segment 51 of the induction welding coil 30 and its conductive element 44 may be electrically connected in series between the first lead 26 and the second lead 28. In other embodiments, referring to FIG. 14, the first segment 50 and the second segment 51 may each be electrically connected to a dedicated power source 22A, 22B through respective electrical leads 26A and 28A, 26B and 28B. With such an arrangement, an electrical current through each conductive element segment 50, 51 may be individually tuned (e.g., adjusted, tailored, etc.) based on the construction of the bodies being welded together; e.g., relative amounts of the fibers aligned with the respective conductive element segment 50, 51.

The induction welding coil 30 is described above with the crossed (e.g., X-shaped) coil head 48. The present disclosure, however, is not limited to such an exemplary configuration. For example, referring to FIG. 15, the conductive element 44 may alternatively be configured to provide the induction welding coil 30 with a (e.g., spiral) looped coil head 48. The conductive element 44 of FIG. 15, for example, is configured into a vertical stack of a plurality of loops 108A-J (generally referred to as "108"); e.g., circular coils. The loops 108 can be configured with different sizes (e.g. different diameters). Referring to FIG. 16, each of the loops 108 may include one or more of the first segments 50 (e.g., welding segments for partially aligning with and/or exciting the first fibers) and one or more of the second segments 51 (e.g., welding segments for partially aligning with and/or exciting the second fibers). Here, each segment 50, 51 of the coil centerline 46 is curved about a vertical axis 110 of the coil head 48. The vertical axes of the loops 108 may be offset from each other, or coaxial with one another. With this arrangement, various different segments of each loop 108 may replace the first segment(s) 50 and the second segment (s) 51. Therefore, at least one segment of each loop 108 may be partially aligned with the first fibers, and at least one segment of each loop 108 may be partially aligned with the second fibers independent of an orientation of the coil head 48 relative to the bodies to be welded. Such an arrangement may also be useful for enhancing induction welding between the bodies where at least one of the bodies include fibers in more than two directions.

Figure 15:
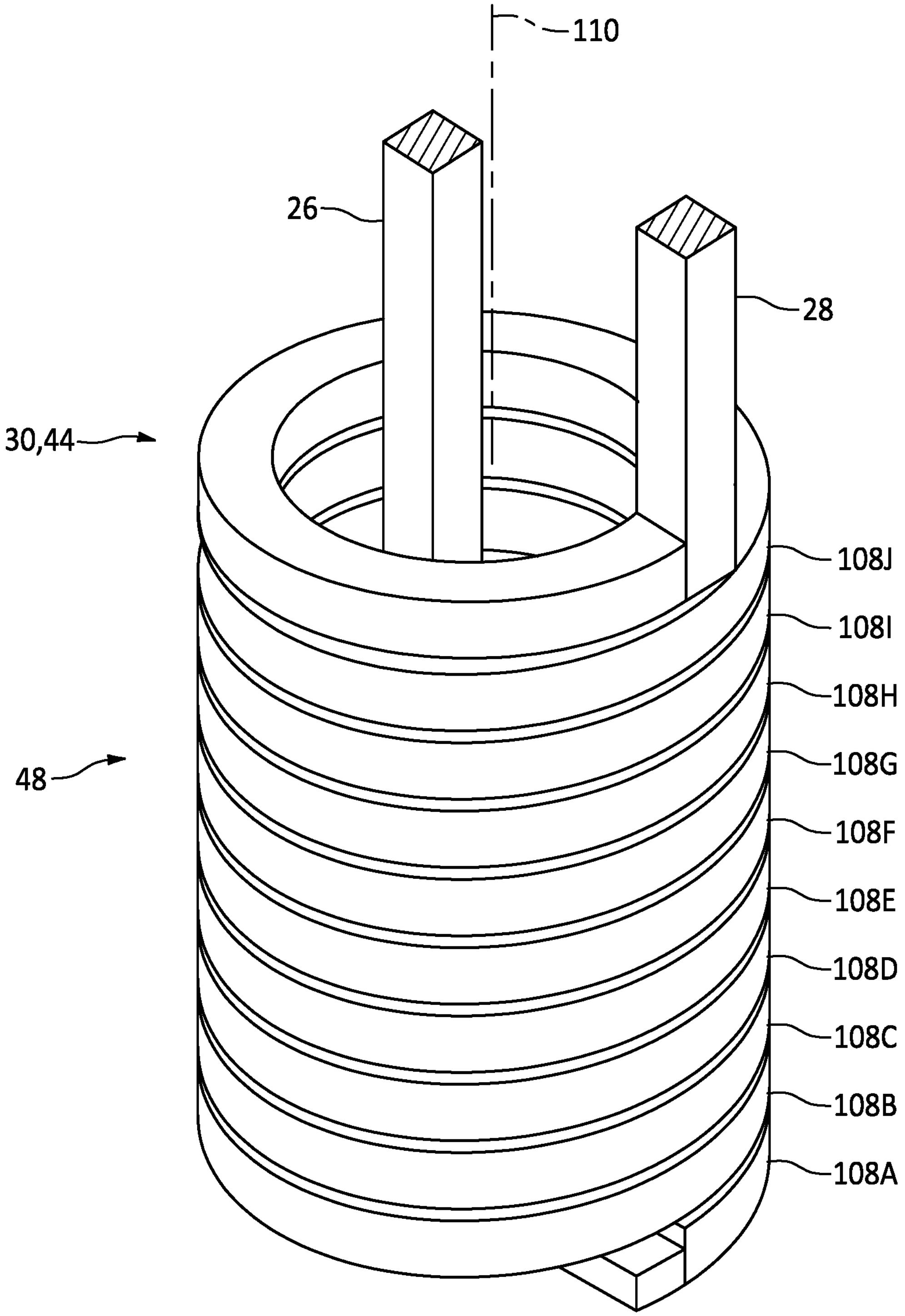
FIG. 15 is a perspective illustration of the induction welding coil with a multi-loop configuration.
Figure 16:
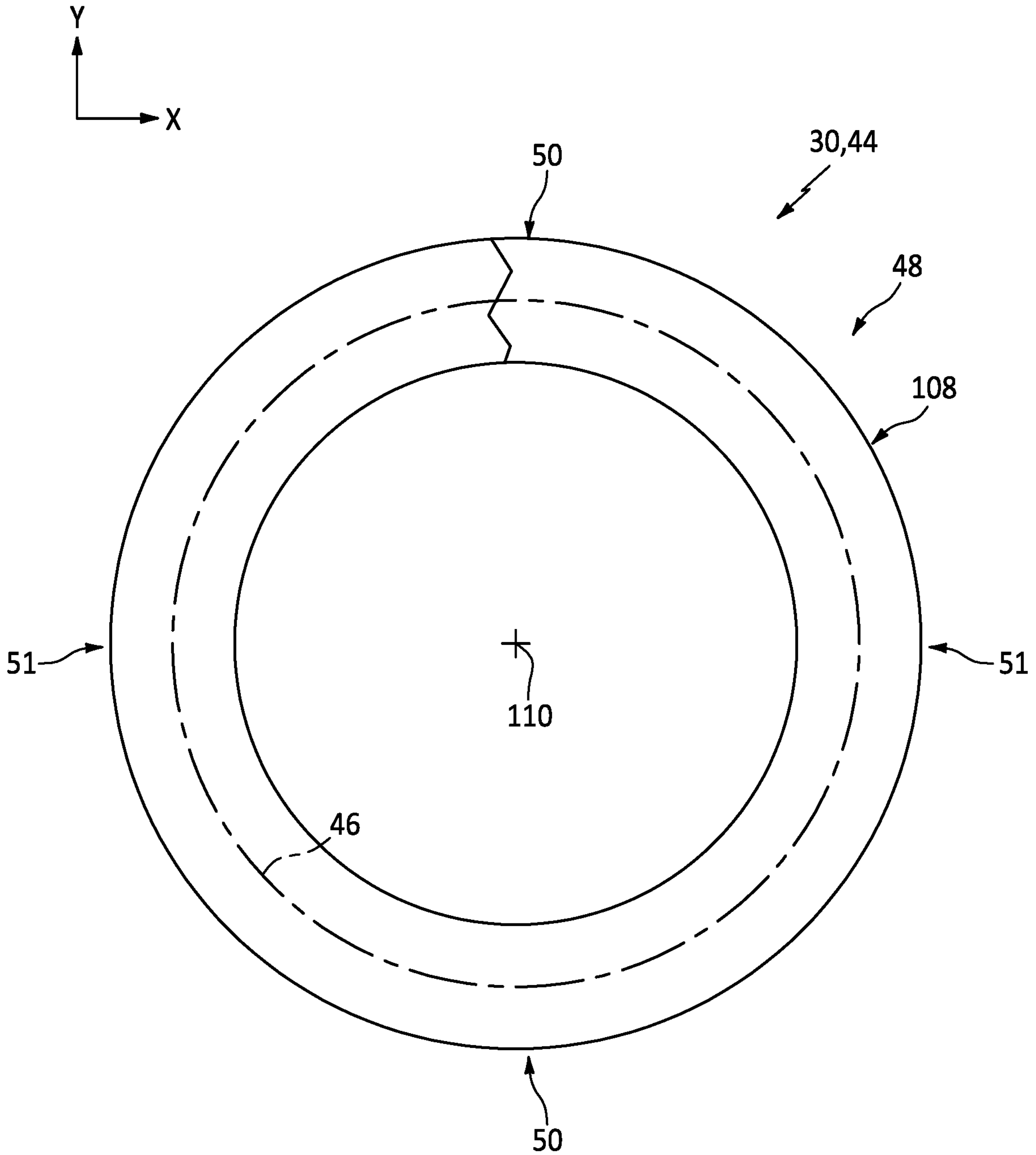
FIG. 16 is an illustration of an exemplary loop included in the induction welding coil of FIG. 15.
Figure 17:
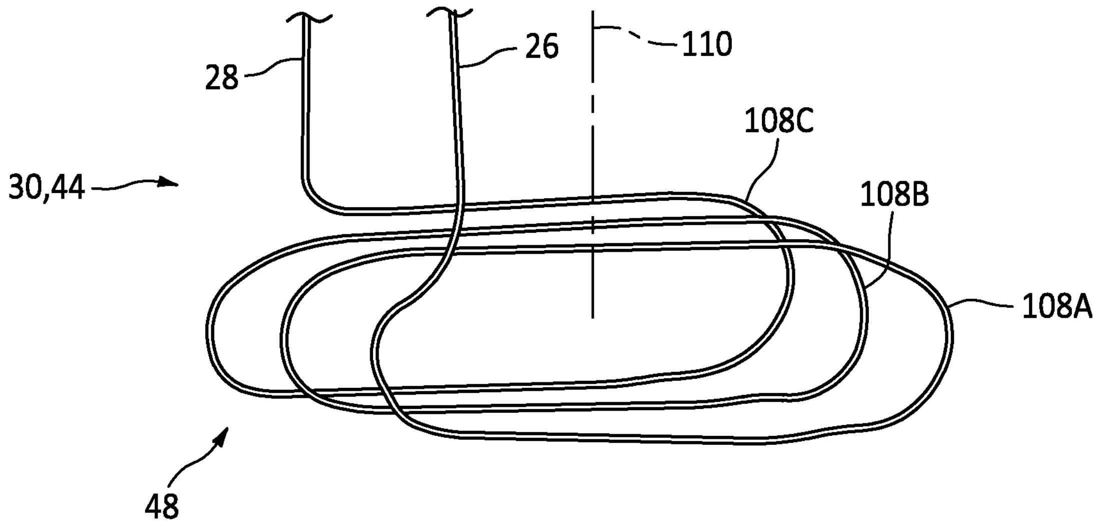
FIG. 17 is a perspective illustration of the induction welding coil with another multi-loop configuration.

In some embodiments, referring to FIGS. 15 and 16, one or more or all of the loops 108 may have a circular geometry. The present disclosure, however, is not limited to such an exemplary loop geometry. For example, referring to FIG. 17, one or more or all of the loops 108 may alternatively have a non-circular geometry. Each loop 108 of FIG. 17, for example, has a polygonal (e.g., rectangular) geometry with eased (e.g., rounded) corners.

In some embodiments, referring to FIGS. 15 and 16, some or all of the loops 108 may be laterally aligned. Centers of the loops 108, for example, may be coaxial with the vertical axis 110. In other embodiments, referring to FIG. 17, some or all of the loops 108 may be laterally offset from one another. The centers of the loops 108, for example, may be non-coaxial with the vertical axis 110.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A manufacturing method, comprising:

arranging a first thermoplastic body with a second thermoplastic body, wherein at least one of the first thermoplastic body or the second thermoplastic body includes a plurality of fibers embedded within a thermoplastic matrix, and the plurality of fibers include a plurality of parallel first fibers and a plurality of parallel second fibers that are angularly offset from the plurality of parallel first fibers;

arranging a conductive element vertically next to a surface of the first thermoplastic body; and induction welding the first thermoplastic body to the second thermoplastic body using the conductive element, wherein the conductive element includes a first segment and a second segment, the first segment is at least substantially parallel with the plurality of parallel first fibers, the second segment is at least substantially parallel with the plurality of parallel second fibers, and a first portion of the conductive element is vertically above and overlaps a second portion of the conductive element.

2. The manufacturing method of claim 1, wherein the induction welding comprising exciting some of the plurality of parallel first fibers and some of the plurality of parallel second fibers with eddy currents generated by the conductive element.

3. The manufacturing method of claim 1, wherein the plurality of parallel second fibers are perpendicular to the plurality of parallel first fibers.

4. The manufacturing method of claim 1, wherein the plurality of parallel second fibers are angularly offset from the plurality of parallel first fibers by an acute angle.

5. The manufacturing method of claim 1, wherein the first portion of the conductive element crosses the second portion of the conductive element.

6. The manufacturing method of claim 1, wherein the first portion of the conductive element is parallel with the second portion of the conductive element.

7. The manufacturing method of claim 1, wherein an airgap is formed by and extends vertically between the first segment and the surface of the first thermoplastic body; and the airgap is further formed by and extends vertically between the second segment and the surface of the first thermoplastic body.

8. The manufacturing method of claim 1, wherein the conductive element extends longitudinally along a centerline;

the first segment extends longitudinally along a first portion of the centerline, and the first portion of the centerline is straight in a reference plane; and the second segment extends longitudinally along a second portion of the centerline, and the second portion of the centerline is straight in the reference plane.

9. The manufacturing method of claim 8, wherein the first portion of the centerline is perpendicular to the second portion of the centerline.

10. The manufacturing method of claim 8, wherein the first portion of the centerline is angularly offset from the second portion of the centerline by an acute angle.

11. The manufacturing method of claim 1, wherein the conductive element is configured into a vertical stack of a plurality of loops.

12. The manufacturing method of claim 11, wherein the first segment and the second segment are included in one of the plurality of loops.

13. The manufacturing method of claim 11, wherein one of the plurality of loops each has a circular geometry.

14. The manufacturing method of claim 11, wherein some or all of the plurality of loops are laterally aligned.

15. The manufacturing method of claim 1, wherein the conductive element extends longitudinally along a centerline;

the first segment extends longitudinally along a first portion of the centerline, and the first portion of the centerline is curved in a reference plane that is parallel with the surface of the first thermoplastic body; and the second segment extends longitudinally along a second portion of the centerline, and the second portion of the centerline is curved in the reference plane.

16. A manufacturing method, comprising:

arranging a first thermoplastic body with a second thermoplastic body, wherein at least one of the first thermoplastic body or the second thermoplastic body includes a plurality of fibers embedded within a thermoplastic matrix;

arranging a first conductive element segment and a second conductive element segment of an induction welder vertically next to a surface of the first thermoplastic body, wherein the first conductive element segment is angularly offset from the second conductive element segment in a reference plane parallel with the surface of the first thermoplastic body, and at least an intermediate portion of the second conductive element segment is vertically above and crosses an intermediation portion of the first conductive element segment; and induction welding the first thermoplastic body to the second thermoplastic body using the first conductive element segment and the second conductive element segment.

17. The manufacturing method of claim 16, wherein the plurality of fibers include a plurality of parallel first fibers and a plurality of parallel second fibers that are angularly offset from the plurality of parallel first fibers;

the first conductive element segment is at least substantially parallel with the plurality of parallel first fibers; and the second conductive element segment is at least substantially parallel with the plurality of parallel second fibers.

18. The manufacturing method of claim 16, wherein the first conductive element segment is angularly offset from the second conductive element segment by a right angle or an acute angle in the reference plane.

19. The manufacturing method of claim 16, wherein the first conductive element segment and the second conductive element segment are arranged in series between and connected to a first lead and a second lead; and the first lead and the second lead electrically connect the first conductive element segment and the second conductive element segment to an electrical power source.

20. A manufacturing method, comprising:

arranging a first thermoplastic body with a second thermoplastic body, wherein at least one of the first thermoplastic body or the second thermoplastic body includes a plurality of fibers embedded within a thermoplastic matrix;

arranging a conductive element vertically next to a surface of the first thermoplastic body, wherein the conductive element is configured into a vertical stack of a plurality of concentric loops; and induction welding the first thermoplastic body to the second thermoplastic body using the plurality of concentric loops.

* * * * *